United States Patent [19]

Kuwabara

[11] Patent Number: 4,778,705

[45] Date of Patent: Oct. 18, 1988

[54] CAR WELT

[75] Inventor: Akira Kuwabara, Ayase, Japan

[73] Assignee: Ikeda Bussan Co., Ltd., Ayase, Japan

[21] Appl. No.: 40,899

[22] Filed: Apr. 21, 1987

[51] Int. Cl.$^4$ .............................................. E06B 7/16
[52] U.S. Cl. .................................... 428/122; 49/490; 52/716; 428/358
[58] Field of Search ................. 428/122, 358; 49/490; 52/716

[56] References Cited

U.S. PATENT DOCUMENTS

| | | | |
|---|---|---|---|
| 1,842,586 | 1/1932 | Davidson | 428/122 |
| 3,665,646 | 5/1972 | Niemanns | 52/716 X |
| 3,807,978 | 4/1974 | Niemanns | 52/716 X |
| 4,443,508 | 4/1984 | Mehl | 428/122 |

FOREIGN PATENT DOCUMENTS

| | | | |
|---|---|---|---|
| 1023701 | 12/1952 | France | 428/358 |
| 2038919 | 7/1980 | United Kingdom | 428/358 |

Primary Examiner—Henry F. Epstein
Attorney, Agent, or Firm—Foley & Lardner, Schwartz, Jeffery, Schwaab, Mack, Blumenthal & Evans

[57] ABSTRACT

A welt made of resins and U-shaped in section to be fitted onto rims of attached members, characterized in that a pair of engaging pieces made integral to the welt at their outer substantially center portions extend expanding outward from inside the U-shaped portion and from both opened opposite rims of the welt, and that the rim portion of an attached member is forcedly inserted into the welt through those clearances which are between front and back ends of the engaging pieces.

9 Claims, 2 Drawing Sheets

CAR WELT

BACKGROUND OF THE INVENTION (a) Field of the Invention

The present invention relates to a car welt suitable for attaching rims of ceiling and floor carpet in a car thereto.

(b) Prior Art

As shown in FIG. 1, the welt of this type is resin-molded to have a U-shaped section. The welt 1 contains a core member 2 made of metal, for example, and includes engaging ribs 1a and 1b which are protruded from the U-shaped inner wall of the welt 1 to face their corresponding ribs 1a and 1b. The rim of a member 3 which is to be attached to the welt 1 is inserted into the welt 1 to engage the engaging ribs 1a and 1b. In other words, clearances between the engaging ribs 1a and between the engaging ribs 1b are set a little smaller than the width of the member 3 which is to be attached to the welt 1 and when the rim of the member 3 is inserted into the welt 1, it is held there by the elastic deformation of the ribs 1a and 1b.

In the case of the conventional welt 1, however, it was troublesome to insert the member 3 into the welt 1 because the U-shaped opening of the welt 1 was narrow. In addition, the attaching of the member 3 could not be efficiently carried out because the welt which was used at the ceiling of the car, for example, was comparatively long. Further, the resin-made welt 1 was reinforced by the core member 2 to have stiffness and restoration force but when it was repeatedly used, its elasticity became weak and it became likely to fall from where it was used.

SUMMARY OF THE INVENTION

The object of the present invention is therefore to provide a welt allowing the attaching of members to be achieved with efficiency and reliability.

According to the present invention, there can be provided a welt made of resins and U-shaped in section to be fitted onto rims of attached members, characterized in that a pair of engaging pieces made integral to the welt at their outer substantially center portions extend expanding outward from inside the U-shaped portion and from both opened opposite rims of the welt, and that the rim portion of an attached member is forcedly inserted into the welt through those clearances which are between front and back ends of the engaging pieces.

According to this welt, the engaging pieces are made integral to the welt, expanding outward from inside the U-shaped portion of the welt, thereby enabling the clearance, through which the attached member is inserted, to be made large. Therefore, the opening clearance of the substantially U-shaped welt can be made larger than the thickness of the attached member and even when the welt is made long for use with the car ceiling, floor carpet and the like, the attaching of the attached member can be achieved with efficiency. In addition, the attached member can be reliably attached to the welt by the action of the paired engaging pieces.

DETAILED DESCRIPTION OF THE PREFERRED EMBODIMENT

Figure 1:
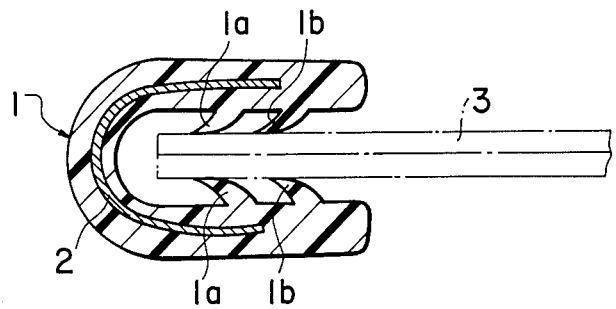
FIG. 1 is a sectional view showing the conventional welt.
Figure 2:
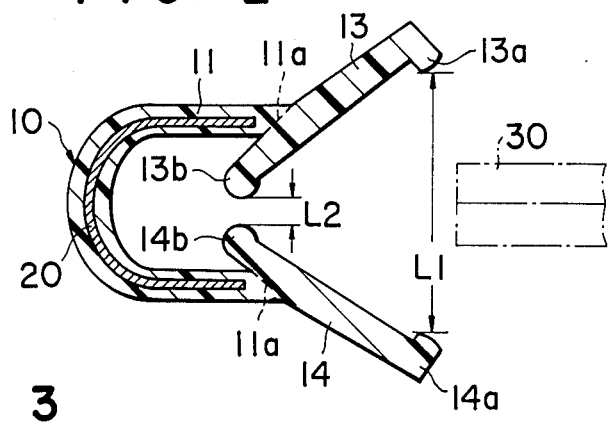
FIG. 2 is a sectional view showing an example of the welt according to the present invention.

FIG. 2 shows an example of the welt according to the present invention. A long welt 10 includes a welt body 11 U-shaped in section and a pair of engaging pieces 13 and 14 made integral to the opened rim portion of the welt body 11, which is formed according to the so-called triple continuous injection molding, using a soft resin for the welt body 11 and a hard resin for the engaging pieces 13 and 14. Soft and hard vinyl chloride resins can be cited as a concrete combination of these complex materials of which the welt 10 is made, and they are combined completely integrally in the course of the injection molding process.

The welt body 11 contains a core material 20 therein to have stiffness and restoration force. The engaging pieces 13 and 14 are arranged at the opened opposite rims of the welt body 11, expanding outward from inside the U-shaped portion of the welt body 11, and made integral thereto at their back center portions (or at their backs between their one ends and the other ends). The paired engaging pieces 13 and 14 are located symmetrical to each other and a front end clearance L1 between protrusions 13a and 14a at the foremost ends of the engaging pieces 13 and 14 is larger than the opening diameter of the welt body 11 while a back end clearance L2 between protrusions 13b and 14b at the back ends of the engaging pieces 13 and 14 is smaller than the opening diameter of the welt body 11. The back end clearance L2 is also set smaller than the thickness of a member 30 which is to be fitted into the welt body 11. The attached member 30 is forcedly fitted into the U-shaped portion of the welt body 11 through the clearance L2.

Figure 3:
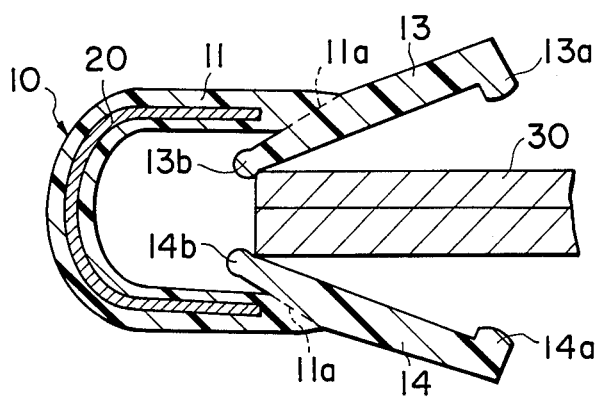
FIG. 3 is a sectional view showing how an attached member is inserted into the welt.
Figure 4:
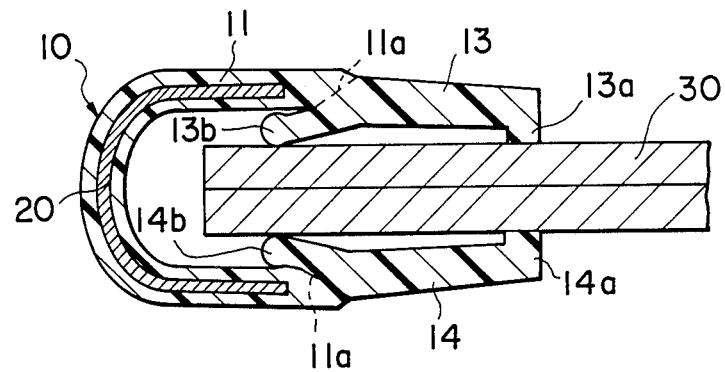
FIG. 4 is a sectional view showing that the attached member has been attached to the welt.

As shown in FIGS. 3 and 4, the member 30 is attached to the welt 10 in such a way that the rim portion of the member 30 is inserted between the paired engaging pieces 13 and 14 through the clearance L1 and then forcedly fitted into the U-shaped portion of the welt body 11 through the clearance L2. The paired engaging pieces 13 and 14 are arranged in deformable manner at the opening of the welt body 11 and extend expanding outward in this case. Therefore, the back ends of the engaging pieces 13 and 14 are forcedly spread round connected portions 11a between the welt body 11 and the engaging pieces 13, 14 to make the clearance L2 larger while the front ends of the engaging pieces 13 and 14 are deformed toward the member 30 to make the clearance L1 smaller. This deformation is provided when the welt body 11 is made of a soft resin and the engaging pieces 13 and 14 of a hard resin, and the connected portions 11a serve as if they were hinges in the course of this deformation to provide easy elastic deformation.

Although the paired engaging pieces have been employed in the case of the above-described embodiment, the same effect can be attained when the U-shaped welt body is provided with the engaging piece only at the one side rim thereof.

Figure 5:
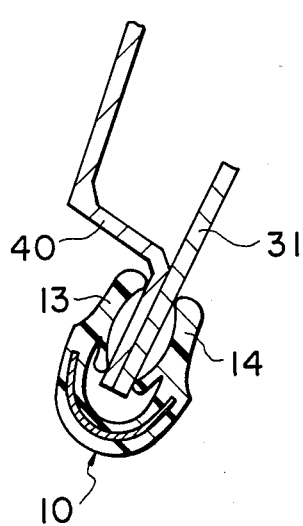
FIG. 5 is a substantially sectional view showing the welt employed at the rim portion of ceiling in a car.
Figure 6:
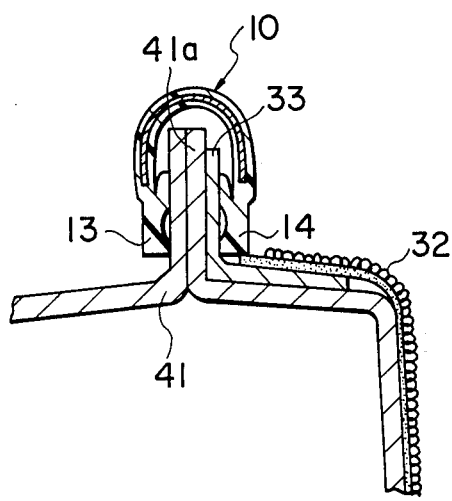
FIG. 6 is a substantially sectional view showing the welt employed at the rim portion of floor carpet in the car.

FIGS. 5 and 6 show examples of the welt 10 used.

FIG. 5 shows the rim portion of a roof 31 in a car and the welt 10 fitted onto that rim portion of the roof 31 which extends toward a roof rail 40. FIG. 6 shows the rim portion of a floor carpet 32, which is attached to erected portions 41a of a side seal 41 through a retainer 33 L-shaped in section. As apparent from the above, the welt 10 of the present invention can be applied to various kind of matters.

Although the present invention has been described citing some preferred embodiments, it should be understood that various changes and modifications can be made by those skilled in the field without departing from the scope and spirit of the present invention.

I claim:

1. A car welt made of resins for fitting onto the rim of an attached member, comprising:
   a welt body having a U-shaped section and defining a first opening; and
   at least one engaging piece integrally connected to and expanding outwardly from the welt body to define a second opening which is larger than the first opening of the welt body.

2. A car welt as defined in claim 1, wherein the engaging piece further comprises a front end and a back end, the front end defining an opening larger than the welt body opening and the back end defining an opening smaller than the welt body opening.

3. A car welt as defined in claim 2, wherein the back end opening is smaller than the thickness of the attached member.

4. A car welt as defined in claim 1, comprising two engaging pieces integrally connected to opposite sides of the welt body opening.

5. A car welt as defined in claim 4, wherein the two engaging pieces are symmetrically arranged around the welt body opening.

6. A car welt as defined in claim 1, wherein the welt body comprises soft resin and the engaging pieces comprise hard resin.

7. A car welt as defined in claim 6, wherein the connection between the welt body and the engaging piece acts as a hinge.

8. A car welt as defined in claim 1, further comprising a core material in the welt body.

9. A car welt as defined in claim 7, wherein insertion of the attached member causes the engaging piece to pivot around the connection between the welt body and the engaging piece.

* * * * *